(12) United States Patent  
He (10) Patent No.: US 12,038,733 B2  
(45) Date of Patent: Jul. 16, 2024

(54) AUTOMATION SYSTEM (71) Applicant: HKC CORPORATION LIMITED, Shenzhen (CN)

(72) Inventor: Huailiang He, Shenzhen (CN)

(73) Assignee: HKC CORPORATION LIMITED, Shenzhen Guangdong (CN)

( * ) Notice: Subject to any disclaimer, the term of this patent is extended or adjusted under 35 U.S.C. 154(b) by 948 days.

(21) Appl. No.: 17/042,727

(22) PCT Filed: Nov. 29, 2018

(86) PCT No.: PCT/CN2018/118061  
§ 371 (c)(1),  
(2) Date: Sep. 28, 2020

(87) PCT Pub. No.: WO2020/093485  
PCT Pub. Date: May 14, 2020

(65) Prior Publication Data  
US 2021/0018889 A1 Jan. 21, 2021

(30) Foreign Application Priority Data  
Nov. 7, 2018 (CN) .......................... 201821833127.1

(51) Int. Cl.  
*H02J 50/10* (2016.01)  
*G05B 19/07* (2006.01)  
*H02J 50/70* (2016.01)

(52) U.S. Cl.  
CPC ............ *G05B 19/075* (2013.01); *H02J 50/10* (2016.02); *H02J 50/70* (2016.02)

(58) Field of Classification Search  
CPC .......... G05B 19/075; H02J 50/10; H02J 50/70  
See application file for complete search history.

(56) References Cited

U.S. PATENT DOCUMENTS

| 6,374,748 | B1 * | 4/2002 | Shiwaku | ................. B61B 13/00 104/243 |
| 2015/0001958 | A1 * | 1/2015 | Abe | ........................ B60L 50/16 307/104 |
| 2018/0166915 | A1 * | 6/2018 | Afridi | ..................... H02J 50/05 |

FOREIGN PATENT DOCUMENTS

| CN | 101425705 A | 5/2009 |
| CN | 103380562 A | 10/2013 |
| CN | 203607874 U | 5/2014 |
| CN | 105119390 A | 12/2015 |

OTHER PUBLICATIONS

International Search Report from International Application No. PCT/CN2018/118061 mailed Aug. 7, 2019.

* cited by examiner

*Primary Examiner* — Thomas C Lee  
*Assistant Examiner* — Ameir Myers  
(74) *Attorney, Agent, or Firm* — Hodgson Russ LLP (57) ABSTRACT

This application discloses an automation system, including a non-contact power-supply device and a moving body device. The non-contact power-supply device includes a power rail, a power-obtaining circuit, and a power supply receiving circuit. The moving body device includes a body, an inverter circuit, and a motor-control circuit. The non-contact power-supply device is configured to supply power to the moving body device.

20 Claims, 3 Drawing Sheets

AUTOMATION SYSTEM

CROSS REFERENCE TO RELATED APPLICATIONS

This application claims priority to Chinese Patent Application No. 201821833127.1, filed with the Chinese Patent Office on Nov. 7, 2018 and entitled "AUTOMATION SYSTEM", which is incorporated herein by reference in its entirety.

TECHNICAL FIELD

This application relates to the field of display technologies, and in particular, to an automation system.

BACKGROUND

In a display panel preparation process, usually, various moving body devices such as a robot hand, a robot arm, and an automated transport vehicle are required for picking and placing a substrate and a panel and transporting materials. Currently, the moving body devices are powered basically by using external power lines. However, to supply power by using an external power line is likely to limit a distance by which a moving body device can move. For example, limited by an intrinsic length of the power line, the moving body device can move by only a specific length and therefore cannot meet a requirement of moving by a longer distance. In addition, when a length by which the moving body device moves exceeds a specific distance, the power line that is placed on an inner side of a caterpillar band of the moving body device sags due to its self-weight, easily causing frictions between external insulation skins of power lines on an upper side and a lower side. Moreover, a part of the power line that is carried out by the moving body device when performing reciprocating motion is excessively long, so that the power line is prone to kinking, knotting and winding inwardly, making an internal line of the power line fracture, dust generated due to the friction of the external insulation skins, and the like, failing to meet a requirement of a dust-free working environment. Furthermore, because a tack and a length by which the moving body device moves during each time of movement are uncertain; in other words, the moving body device may need to move to a position of a machine, and may also need to move to a port location of a loading and unloading device, and a length of a power line provided on each moving body device is fixed, it is very likely that the moving body device can move only to the machine position or the port location. Besides, a service life of the power line required in the wired power-supply manner is only three to four years, and the costs thereof are relatively high.

Therefore, the following problem is a technical problem urgent to be resolved by a person skilled in the art: how to design an automation system to effectively resolve a problem that a length by which a moving body device moves is limited by a length of a power line and places to which the moving body device can move are undiversified, and to enable the moving body device to be applicable to a working place requiring a dust-free condition.

SUMMARY

According to various embodiments of this application, an automation system is provided. The automation system is configured to effectively resolve a problem that a length by which a moving body device moves is limited by a length of a power line and places to which the moving body device can move are undiversified, to enable the moving body device to be applicable to a working place requiring a dust-free condition. In addition, the automation system has a relatively long service life and relatively low costs.

An automation system, includes:

a non-contact power-supply device, configured to supply power to a moving body device, and including a power rail, a power-obtaining circuit, and a power supply receiving circuit, where the power-obtaining circuit and the power supply receiving circuit are mounted on the moving body device, and are configured to: when the moving body device moves, obtain an inductive alternating current by using an electromagnetic induction effect between the power-obtaining circuit and the power rail, and an input end of the power supply receiving circuit is electrically connected to the power-obtaining circuit, and is configured to convert the inductive alternating current obtained by the power-obtaining circuit into a stably-output direct current; and the moving body device, including a body, an inverter circuit, and a motor-control circuit, where the inverter circuit and the power supply receiving circuit are disposed on the body, an input end of the inverter circuit is electrically connected to an output end of the power supply receiving circuit, and an output end of the inverter circuit is electrically connected to an input end of the motor-control circuit, and the inverter circuit is configured to invert the direct current stably output by the non-contact power-supply device into an alternating current required by the moving body device, to supply power to the motor-control circuit for driving the moving body device to move.

In an embodiment, the automation system includes: a plurality of moving body devices, a plurality of power-obtaining circuits and a plurality of power supply receiving circuits that are provided corresponding to the plurality of moving body devices, and the plurality of moving body devices are all powered by the non-contact power-supply device.

In an embodiment, a high-frequency current of the non-contact power-supply device is provided by a high-frequency power supply box.

In an embodiment, the power rail includes: a first guide rail, a second guide rail disposed opposite to the first guide rail, and a primary induction coil that is laid along inner sides of the first guide rail and the second guide rail and forms a complete loop, the primary induction coil generates an electromagnetic induction force after being conducted, the power-obtaining circuit includes a coil-winding portion, and the coil-winding portion is configured to wind around a secondary induction coil, and when the moving body device moves, the secondary induction coil obtains an inductive alternating current by using an electromagnetic induction effect between the secondary induction coil and the primary induction coil.

In an embodiment, the high-frequency power supply box includes a non-induction line configured to connect the high-frequency power supply box and the primary induction coil.

In an embodiment, the non-induction line is a single line, and power provided by the high-frequency power supply box includes single-wire 20 kW and single-wire 30 kW.

In an embodiment, the non-induction line is a double line, and power provided by the high-frequency power supply box includes double-wire 7 kW and double-wire 40 kW.

In an embodiment, the power rail is further provided with a thermal wire, the thermal wire is laid along a track of the primary induction coil, and the thermal wire is configured to automatically stop operation of the non-contact power-supply device and stop supplying power to the moving body device after detecting a high temperature.

In an embodiment, the power-obtaining circuit is an E-shaped magnetic core, two parallel magnetic core parts at two ends of the E-shaped magnetic core form a first magnetic pole portion and a second magnetic pole portion, and a magnetic core part on a middle position and parallel to the first magnetic pole portion and the second magnetic pole portion forms the coil-winding portion.

In an embodiment, the E-shaped magnetic core is located above the power rail, and an opening of the E-shaped magnetic core faces toward the power rail, so that the first magnetic pole portion and the second magnetic pole portion are respectively located on external sides of the first guide rail and the second guide rail, and the coil-winding portion is located on the inner sides of the first guide rail and the second guide rail.

In an embodiment, the power-obtaining circuit is a single-wire circuit, and a rated power of the power-obtaining circuit is 0.6 kW.

In an embodiment, the power-obtaining circuit is a single-wire circuit, and a rated power of the power-obtaining circuit is 1.5 kW.

In an embodiment, the power-obtaining circuit is a single-wire circuit, and a rated power of the power-obtaining circuit is single-wire 2.5 kW.

In an embodiment, the power-obtaining circuit is a single-wire circuit, and a rated power of the power-obtaining circuit is double-wire 5 kW.

In an embodiment, the power supply receiving circuit is of a constant voltage output type DC 320 V.

In an embodiment, output power of the power supply receiving circuit includes any one of 1.2 kW, 1.5 kW, single-wire 2.5 kW, and double-wire 5 kW.

In an embodiment, a bottom of the body is provided with a base, and the power-obtaining circuit and the power supply receiving circuit are mounted on a lower end face of the base.

In an embodiment, the lower end face of the base is provided with a mounting position, configured to fixedly mount the power-obtaining circuit and the power supply receiving circuit.

In an embodiment, a bottom of the body is provided with a base, and the power-obtaining circuit and the power supply receiving circuit are mounted on a left end face of the base.

In an embodiment, a bottom of the body is provided with a base, and the power-obtaining circuit and the power supply receiving circuit are mounted on a right end face of the base.

Because the foregoing automation system is provided with the non-contact power-supply device; in other words, there is no electrical connection nor physical contact between a transmission line and a load, the non-contact power-supply device and the moving body device do not need to be powered by connecting a power line, thereby effectively resolving a problem that a distance by which the moving body device moves is limited by an intrinsic length of the power line, and also resolving a problem of a wired power-supply manner such as possible winding and wearing or molting caused by friction when the moving body device performs reciprocating motion. In addition, that there is no physical contact between the transmission line and the moving body device may further effectively avoid problems such as spark generation and wearing due to contact between the non-contact power-supply device and the moving body device, to further avoid environmental problems such as fine particles and dust. Therefore, supplying power by the non-contact power-supply device can meet a requirement that the moving body device works in a dust-free place. Moreover, compared with the wired power-supply manner in which a service life of the power line can reach as long as three to four years, supplying power by using the non-contact power-supply device enables the service life of the power line to be at least ten years, and therefore a service life of the system is relatively long and the costs are relatively low.

BRIEF DESCRIPTION OF THE DRAWINGS

To describe the technical solutions of the embodiments of this application or the exemplary technologies more clearly, the following briefly introduces the accompanying drawings required for describing the embodiments or the exemplary technologies. Apparently, the accompanying drawings in the following description show only some embodiments of the present application, and persons of ordinary skill in the art may still derive other drawings from these accompanying drawings without creative efforts.

DETAILED DESCRIPTION OF THE EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

It should be understood that the terms "comprise", "include", and/or variants thereof, when used in this specification and the appended claims, indicate the presence of described features, integers, steps, operations, elements, and/or components, but do not preclude the presence or addition of one or more other features, integers, steps, operations, elements, components, and/or groups thereof.

It should also be understood that the terminology used in the description of this application is for the purpose of describing specific embodiments only and is not intended to be limiting of this application. As used in this specification and the appended claims of this application, the singular forms "a", "an" and "the" are intended to include the plural forms as well, unless the context clearly indicates otherwise.

The directional terms mentioned in this application, like "on", "below", "front", "back", "left", "right", "inner", "outer", and "side surface" only refer to the directions in the accompanying drawings. Therefore, the directional terms used herein are merely used for illustrating and explaining this application rather than limiting this application. In addition, in the accompanying drawings, similar or same structures are denoted by same reference numerals.

Figure 1:
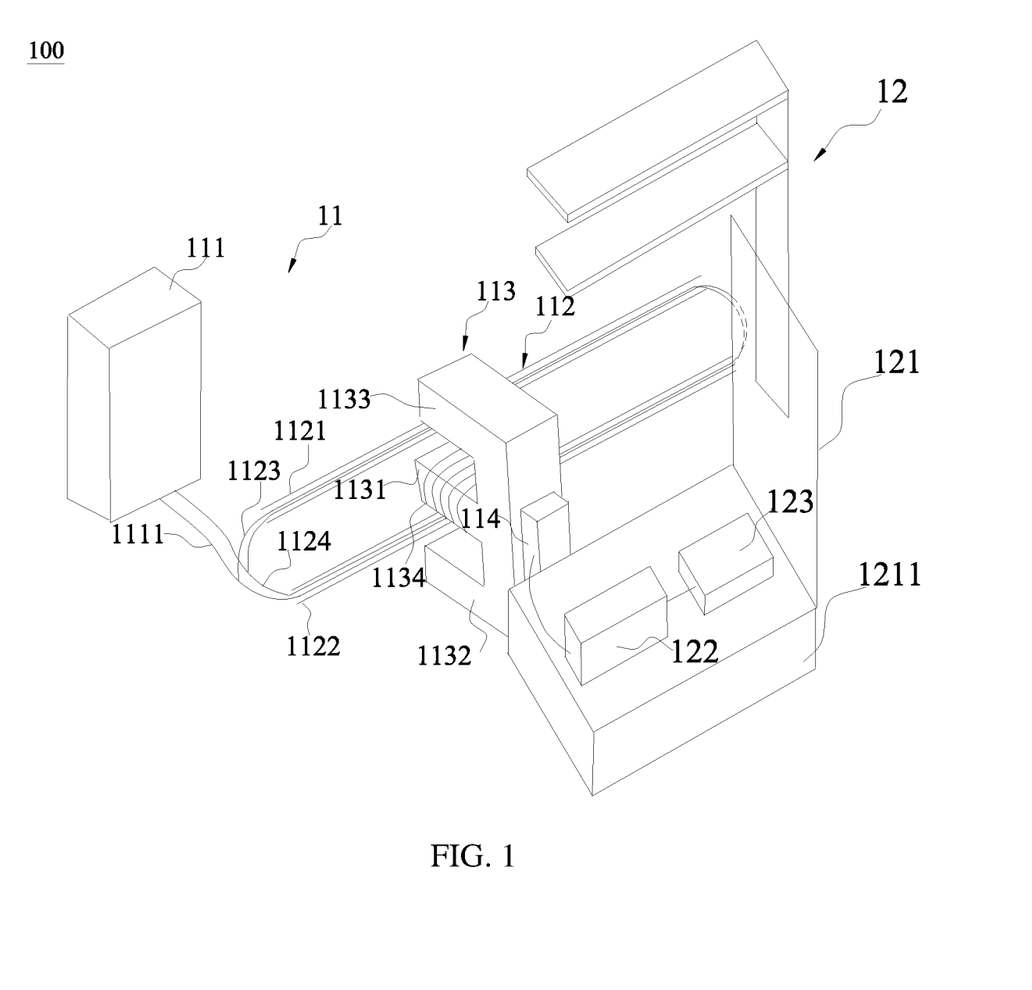
FIG. 1 is a schematic structural diagram of an automation system according to a first embodiment of this application.

Referring to FIG. 1, FIG. 1 is a schematic structural diagram of an automation system according to a first embodiment of this application. Specifically, in this embodiment, the automation system 100 includes a non-contact power-supply device 11 and a moving body device 12. The automation system 100 may be applied to a place such as a manufacturing workshop or a warehousing workshop, and in particular, to a working place that needs to keep dust-free. A specific application range of the automation system 100 is not limited herein. The following describes in detail the structure and working principles of the automation system 100 with reference to the accompanying drawings of this specification.

As shown in FIG. 1, the non-contact power-supply device 11 in the automation system 100 is configured to supply power to the moving body device 12, so that the moving body device 12 can continuously obtain power supplying during moving operation. In some feasible embodiments, for example, in this embodiment, the non-contact power-supply device 11 includes a power rail 112, a power-obtaining circuit 113, and a power supply receiving circuit 114, and the moving body device 12 includes a body 121, an inverter circuit 122, and a motor-control circuit 123. The moving body device may be, for example, an automated transport vehicle, a robot hand, a robot arm, and the like. For example, in this embodiment, the moving body device 12 is a robot hand configured to perform an operation of picking goods for a long distance.

A non-contact power-supply manner provided by the non-contact power-supply device 11 is that there is no electrical connection nor physical contact between a transmission line and a load; in other words, there is no electrical connection nor physical contact between the transmission line and the moving body device 12, and therefore the non-contact power-supply device 11 and the moving body device 12 do not need to be powered by connecting a power line, thereby effectively resolving a problem that a distance by which the moving body device 12 can move is limited by an intrinsic length of the power line, and also resolving a problem of a wired power-supply manner such as possible winding and wearing or molting caused by friction when the moving body device 12 performs reciprocating motion. In addition, there is no physical contact between the transmission line and the moving body device 12 may further effectively prevent the non-contact power-supply device 11 and the moving body device 12 from spark generation and wearing due to contact with each other, to further avoid environmental problems such as fine particles and dust. Therefore, supplying power by the non-contact power-supply device 11 can meet a requirement that the moving body device 12 needs to work in a dust-free place. Moreover, compared with the wired power-supply manner in which a service life of the power line can reach as long as three to four years, supplying power by using the non-contact power-supply device enables the service life of the power line to be at least ten years, and a service life of the system is relatively long and the costs are relatively low.

A theoretical basis of the non-contact power supply manner provided by the non-contact power-supply device 11 is the electromagnetic induction principle. That is, a primary induction coil on the transmission line generates an electromagnetic field due to conduction of a high-frequency alternating current, a part of a conductor that is of a secondary induction coil of a power-obtaining circuit mounted on the load cuts magnetic induction lines in the magnetic field, and the conductor of the power-obtaining circuit generates a current, and an inducting voltage is transmitted to the moving body device 12 after rectification and transformation is performed by the power supply receiving circuit. In some feasible embodiments, for example, in this embodiment, a high-frequency power supply box 111 provides a high-frequency current to the non-contact power-supply device 11, and the high-frequency power supply box 111 has a cuboid shape and is configured to convert commercial power supply into the high-frequency current required by the non-contact power-supply device. In some feasible embodiments, for example, in this embodiment, the high-frequency power supply box provides a three-phase alternating current of 200 V, the high-frequency power supply box 111 includes a non-induction line 1111 configured to connect the high-frequency power supply box 111 and the primary induction coil 1123, and the non-induction line 1111 is configured to transmit the high-frequency current to the primary induction coil 1123. In some feasible embodiments, for example, in this embodiment, the non-induction line 1111 is a single line, and the high-frequency power supply box 111 provides power including single-wire 20 kW and single-wire 30 kW. In some other feasible embodiments, the non-induction line is a double line, and the high-frequency power supply box 111 provides power including double-wire 7 kW and double-wire 40 kW. The non-contact power-supply device 11 includes a power rail 112, a power-obtaining circuit 113, and a power supply receiving circuit 114. The power-obtaining circuit 113 and the power supply receiving circuit 114 are mounted on the moving body device 12 and are configured to obtain, based on an electromagnetic induction effect between the power-obtaining circuit 113 and the power rail 112, an inductive alternating current when the moving body device 12 moves. An input end of the power supply receiving circuit 114 is electrically connected to the power-obtaining circuit 113, and is configured to convert the inductive alternating current obtained by the power-obtaining circuit 113 into a stably-output direct current. The power rail 112 includes: a first guide rail 1121, a second guide rail 1122 disposed opposite to the first guide rail, and the primary induction coil 1123 that is laid along inner sides of the first guide rail 1121 and the second guide rail 1122 and that forms a complete loop. In some feasible embodiments, for example, in this embodiment, the first guide rail 1121 and the second guide rail 1122 are laid along a track during moving operation of the moving body device 12. Because the non-contact power-supply device 11 supplies power to the moving body device 12, a path needs to be laid based on a long-distance working path of the moving body device 12. The primary induction coil 1123 is a transmission line of the non-contact power-supply device 11, and the primary induction coil 1123 generates an electromagnetic induction force after being conducted. The power-obtaining circuit 113 includes a coil-winding portion 1131. The coil-winding portion 1131 is configured to wind around the secondary induction coil. When the moving body device 12 moves, the secondary induction coil obtains an inductive alternating current by using an electromagnetic induction effect between the secondary induction coil and the primary induction coil. The power-obtaining circuit 113 is an E-shaped magnetic core. Two parallel magnetic core parts at two ends of the E-shaped magnetic core form a first magnetic pole portion 1132 and a second magnetic pole portion 1133. A magnetic core part on a middle position and parallel to the first magnetic pole portion 1132 and the second magnetic pole portion 1133 forms the coil-winding portion 1131. The E-shaped magnetic core is located above an end of the power rail 112 adjacent to the moving body device 12, and an opening of the E-shaped magnetic core faces toward the power rail 112, so that the first magnetic pole portion 1132 and the second magnetic pole portion 1133 are respectively located on external sides of the first guide rail 1121 and the second guide rail 1122, and the coil-winding portion 1131 is located on the inner sides of the first guide rail 1121 and the second guide rail 1122. In some feasible embodiments, for example, in this embodiment, the power-obtaining circuit 113 is a single-wire circuit, and a rated power of the power-obtaining circuit 113 includes 0.6 kW, 1.5 kW, single-wire 2.5 kW, double-wire 5 kW, and the like. In this embodiment, after "E" of the E-shaped magnetic core is rotated by 90 degrees clockwise, the opening of the E-shaped magnetic core faces toward the power rail 112, and the middle position of the E-shaped magnetic core is inserted between the first guide rail 1121 and the second guide rail 1122. The middle position of the E-shaped magnetic core is the coil-winding portion 1131 configured to wind around the secondary induction coil 1134; in other words, the coil-winding portion 1131 is located between the first guide rail 1121 and the second guide rail 1122, and a part of a conductor of the secondary induction coil 1134 cuts magnetic induction lines in a magnetic field, to obtain the inductive alternating current. In some feasible embodiments, for example, in this embodiment, after being conducted with the high-frequency current, the primary induction coil 1123 can generate a magnetic field in the power rail 112, to effectively transmit power to the moving body device 12 by using an electromagnetic induction effect between the primary induction coil 1123 and the secondary induction coil 1134 on the power-obtaining circuit 113. The power supply receiving circuit 114 is located between the power-obtaining circuit 113 and the moving body device 12, and an input end of the power supply receiving circuit 114 is electrically connected to the power-obtaining circuit 113, and is configured to convert the inductive alternating current obtained by the power-obtaining circuit 113 into a stably-output direct current. In some feasible embodiments, the power supply receiving circuit 114 is of a constant voltage output type DC 320 V, and selective power of the power supply receiving circuit 114 includes 1.2 kW, 1.5 kW, single-wire 2.5 kW, and double-wire 5 kW. In some feasible embodiments, for example, in this embodiment, the power rail 112 is further provided with a thermal wire 1124. The thermal wire 1124 is configured to automatically stop operation of the non-contact power-supply device 11 and stop supplying power to the moving body device 12 after detecting a high temperature. The thermal wire 1124 is laid along the track of the primary induction coil 1123.

The moving body device 12 in the automation system 100 includes a body 121, an inverter circuit 122, and a motor-control circuit 123. The inverter circuit 122 and the power supply receiving circuit 114 are disposed on the body 121. An input end of the inverter circuit 122 is electrically connected to an output end of the power supply receiving circuit 114, and an output end of the inverter circuit 122 is electrically connected to an input end of the motor-control circuit 123. The inverter circuit 122 is configured to invert the direct current stably output by the non-contact power-supply device 11 into an alternating current required by the moving body device 12, to supply power to the motor-control circuit 123 for driving the moving body device 12 to move. In some feasible embodiments, a bottom of the body 121 is provided with a base 1211. The power-obtaining circuit 113 and the power supply receiving circuit 114 are mounted on a left end face of the base. A mounting position is disposed on the left end face of the base 1211, and is configured to fixedly mount the power-obtaining circuit 113 and the power supply receiving circuit 114.

In the foregoing embodiment, the automation system 100 includes the non-contact power-supply device 11 and the moving body device 12. The high-frequency power supply box 111 provides the high-frequency current to the non-contact power-supply device 11. The non-contact power-supply device 11 includes the power rail 112, the power-obtaining circuit 113, and the power supply receiving circuit 114. The moving body device 12 includes the body 121, the inverter circuit 122, and the motor-control circuit 123. The power rail 112 includes the primary induction coil 1123 disposed on the inner sides of the first guide rail 1121 and the second guide rail 1122. The power-obtaining circuit 113 includes the secondary induction coil 1134 disposed on the coil-winding portion 1131. The high-frequency alternating current on the primary induction coil 1123 generates the magnetic field after being conducted. The secondary induction coil 1134 obtains the induced current after performing cutting motion in the magnetic field. By using the electromagnetic induction effect between the primary induction coil 1123 and the secondary induction coil 1134, the high-frequency alternating current is transmitted to the power-obtaining circuit 113, and the stable direct current is output to the moving body device 12 after the rectification and transformation is performed by the power supply receiving circuit 114. Further, the stably input direct current is inverted, by using the inverter circuit 122 on the moving body device 12, into the alternating current required by the moving body device 12, so that there is no electrical connection nor physical contact between the transmission line and the load, thereby effectively resolving a problem that a length by which the moving body device 12 moves is limited by an intrinsic length of the power line. The power rail is designed and laid along a working track of the moving body device 12, so that the moving body device 12 can perform reciprocating motion in a plurality of places that needs to be worked in, thereby resolving a problem that places to which the moving body device 12 can move are undiversified due to the intrinsic power line length, and also avoiding a problem such as possible winding and wearing or molting caused by friction when the moving body device 12 performs the reciprocating motion. In addition, that there is no physical contact between the transmission line and the moving body device 12 may further effectively prevent a problem such as spark generation or wearing between the non-contact power-supply device 11 and the moving body device due to contact between the non-contact power-supply device 11 and the moving body device, and therefore can further prevent the environmental problem such as fine particles and dust. Therefore, supplying power by using the non-contact power-supply device 11 enables the moving body device 12 to work in a place that requires a dust-free condition, and a service life of the moving body device 12 is relatively long and the costs are relatively low.

Figure 2:
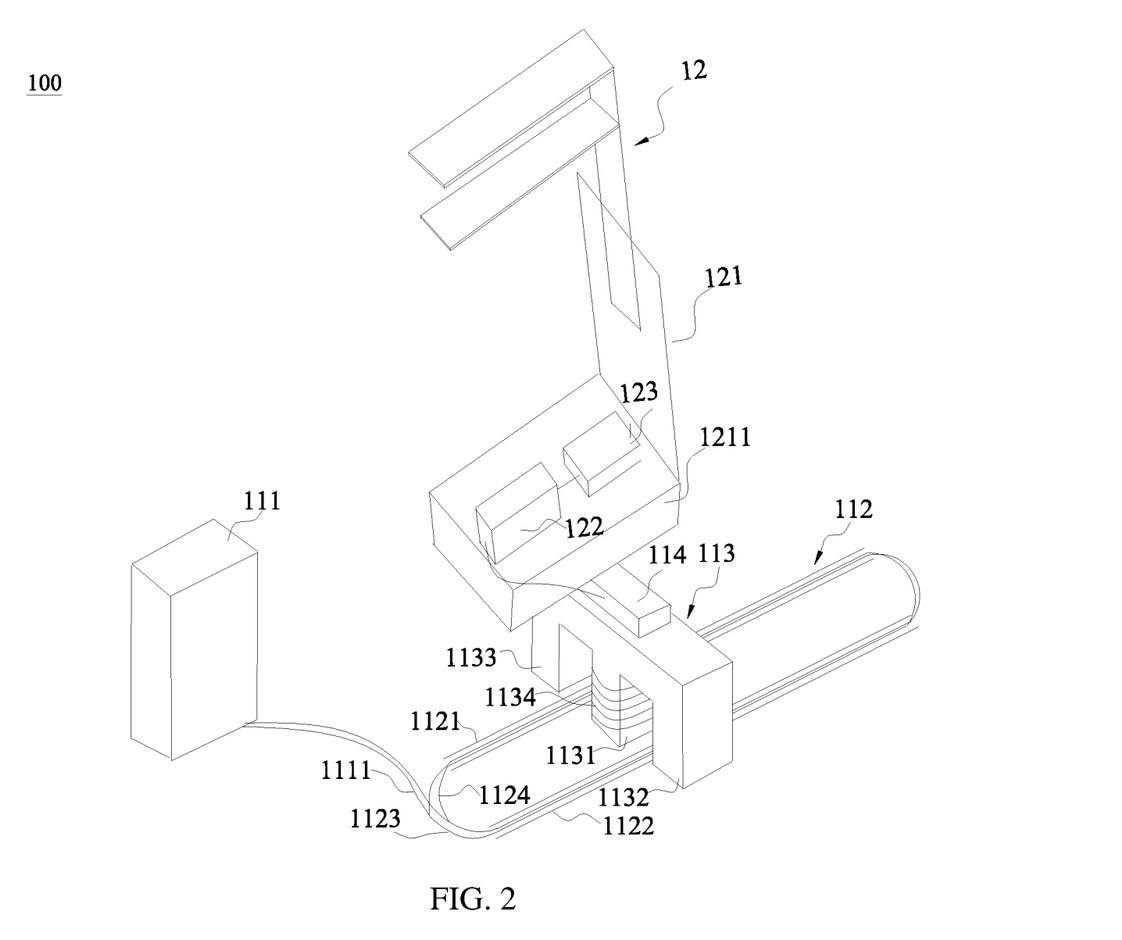
FIG. 2 is a schematic structural diagram of an automation system according to a second embodiment of this application.

FIG. 2 is a schematic structural diagram of an automation system according to a second embodiment of this application. Specifically, in this embodiment, the automation system 100 may be applied to a place such as a manufacturing workshop or a warehousing workshop, and in particular, to a working place that needs to keep dust-free. A specific application range of the automation system 100 is not limited herein. The following describes in detail the structure and working principles of the automation system 100 with reference to the accompanying drawings of this specification.

As shown in FIG. 2, a non-contact power-supply device 11 in the automation system 100 is configured to supply power to a moving body device 12, so that the moving body device 12 can continuously obtain power supplied during moving operation.

This embodiment is different from the first embodiment in that, the bottom of the body 121 is provided with a base 1211, the power-obtaining circuit 113 and the power supply receiving circuit 114 are mounted on a lower end face of the base, and a mounting position is provided on the lower end face of the base 1211 and is configured to fixedly mount the power-obtaining circuit 113 and the power supply receiving circuit 114. In some other feasible embodiments, the power-obtaining circuit 113 and the power supply receiving circuit 114 are mounted on a right end face of the base 1211.

In the foregoing embodiment, the automation system 100 includes the non-contact power-supply device 11 and the moving body device 12. The high-frequency power supply box 111 provides the high-frequency current to the non-contact power-supply device 11. The non-contact power-supply device 11 includes the power rail 112, the power-obtaining circuit 113, and the power supply receiving circuit 114. The moving body device 12 includes the body 121, the inverter circuit 122, and the motor-control circuit 123. The power rail 112 includes the primary induction coil 1123 disposed on the inner sides of the first guide rail 1121 and the second guide rail 1122. The power-obtaining circuit 113 includes the secondary induction coil 1134 disposed on the coil-winding portion 1131. The high-frequency alternating current on the primary induction coil 1123 generates the magnetic field after being conducted. The secondary induction coil 1134 obtains the induced current after performing cutting motion in the magnetic field. By using the electromagnetic induction effect between the primary induction coil 1123 and the secondary induction coil 1134, the high-frequency alternating current is transmitted to the power-obtaining circuit 113, and the stable direct current is output to the moving body device 12 after the rectification and transformation is performed by the power supply receiving circuit 114. Further, the stably input direct current is inverted, by using the inverter circuit 122 on the moving body device 12, into the alternating current required by the moving body device 12, so that there is no electrical connection nor physical contact between the transmission line and the load, thereby effectively resolving a problem that a length by which the moving body device 12 moves is limited by an intrinsic length of the power line. The power rail is designed and laid along a working track of the moving body device 12, so that the moving body device 12 can perform reciprocating motion in a plurality of places that needs to be worked in, thereby resolving a problem that places to which the moving body device 12 can move are undiversified due to the intrinsic power line length, and also avoiding a problem such as possible winding wearing or molting caused by friction when the moving body device 12 performs the reciprocating motion. In addition, that there is no physical contact between the transmission line and the moving body device 12 may further effectively prevent a problem such as spark generation or wearing between the non-contact power-supply device 11 and the moving body device due to contact between the non-contact power-supply device 11 and the moving body device, and therefore can further prevent the environmental problem such as fine particles and dust. Therefore, supplying power by using the non-contact power-supply device 11 enables the moving body device 12 to work in a place that requires a dust-free condition, and a service life of the moving body device 12 is relatively long and the costs are relatively low.

Figure 3:
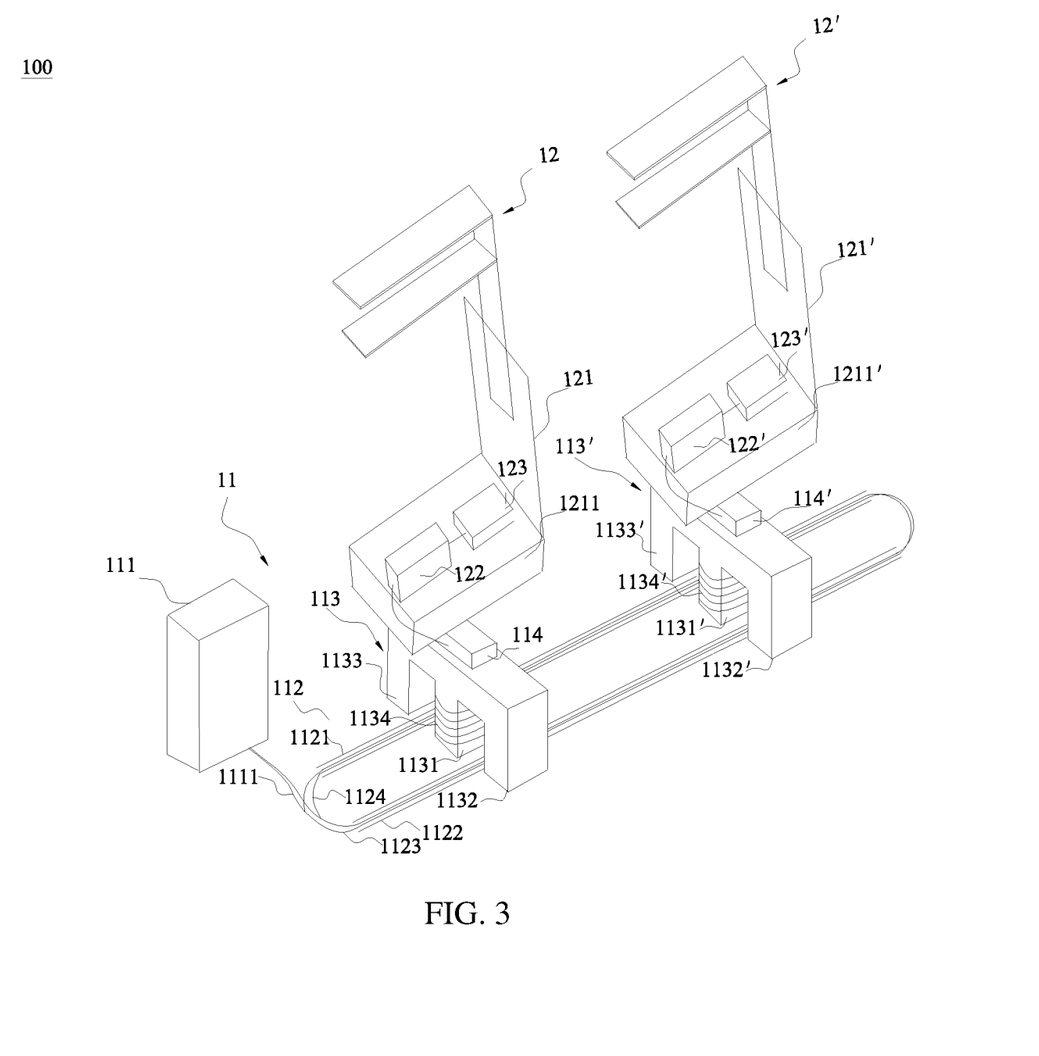
FIG. 3 is a schematic structural diagram of an automation system according to a third embodiment of this application.

FIG. 3 is a schematic structural diagram of an automation system according to a third embodiment of this application. Specifically, in this embodiment, the automation system 100 may be applied to a place such as a manufacturing workshop or a warehousing workshop, and in particular, to a working place that needs to keep dust-free. A specific application range of the automation system 100 is not limited herein. The automation system 100 includes: a plurality of moving body devices 12, a plurality of power-obtaining circuits 113 and a plurality of power supply receiving circuits 114 that are provided corresponding to the plurality of moving body devices 12. The plurality of moving body devices 12 are all powered by the non-contact power-supply device 11.

This embodiment is different from the second embodiment in that, the non-contact power-supply device 11 supplies power to two moving body devices; in other words, supplies power to a first moving body device 12 and a second moving body device 12'. In some other feasible embodiments, the non-contact power-supply device 11 may supply power to at least one moving body device 12. A specific quantity of the moving body devices 12 to which the non-contact power-supply device 11 supplies power is not limited herein. The voltage and the power of the high-frequency power supply box 111 of the non-contact power-supply device 11 can meet a condition of supplying power to the first moving body device 12 and the second moving body device 12' at the same time, and therefore the first moving body device 12 and the second moving body device 12' can obtain sufficient power to perform an operation of picking goods for a long distance.

In this embodiment, the automation system 100 includes the non-contact power-supply device 11, the first moving body device 12, and the second moving body device 12'. The non-contact power-supply device 11 includes the high-frequency power supply box 111, the power rail 112, a first power-obtaining circuit 113, a second power-obtaining circuit 113', a first power supply receiving circuit 114, and a second power supply receiving circuit 114'. The first moving body device 12 includes the body 121, the inverter circuit 122, and the motor-control circuit 123. The body 121 further includes the base 1211, and the first power-obtaining circuit 113 and the first power supply receiving circuit 114 are mounted on the lower end face of the base 1211. The power rail 112 includes the primary induction coil 1123 disposed on the inner sides of the first guide rail 1121 and the second guide rail 1122. The power-obtaining circuit 113 includes the secondary induction coil 1134 disposed on the coil-winding portion 1131. The high-frequency alternating current on the primary induction coil 1123 generates the magnetic field after being conducted. The secondary induction coil 1134 obtains the induced current after performing cutting motion in the magnetic field. By using the electromagnetic induction effect between the primary induction coil 1123 and the secondary induction coil 1134, the high-frequency alternating current is transmitted to the power-obtaining circuit 113, and the stable direct current is output to the moving body device after the rectification and transformation is performed by the power supply receiving circuit 114. In some feasible embodiments, for example, in this embodiment, the structure, the principles, and use of the first moving body device 12 and the second moving body device 12' are the same. In other words, the second moving body device 12' includes a body 121', an inverter circuit 122', and a motor-control circuit 123'. The body 121' further includes a base 1211', and the second power-obtaining circuit 113', and the second power supply receiving circuit 114' are mounted on a lower end face of the base 1211'. In some other feasible embodiments, the power-obtaining circuit 113' is further disposed on an end face that is of the base 1211' and that faces toward the power rail. The inverter circuit 122' is located on the body 121'. An input end of the inverter circuit is electrically connected to an output end of the second power supply receiving circuit 114'. The inverter circuit 122' is configured to invert the direct current stably output by the non-contact power-supply device 11 into an alternating current required by the second moving body device 12', to supply power to the second moving body device 12', so that the second moving body device 12' continuously obtains power during moving operation. The motor-control circuit 123' is located on the body 121', and an input end of the motor-control circuit 123' is electrically connected to an output end of the inverter circuit 122', and the motor-control circuit 123' is configured to drive the second moving body device 12' to move.

In the foregoing embodiment, by using an electromagnetic induction effect between the primary induction coil 1123 and the secondary induction coil 1134 and an electromagnetic induction effect between a primary induction coil 1123' and a secondary induction coil 1134', the non-contact power-supply device can provide operation power to the moving body device when there is no electrical connection nor physical contact between the non-contact power-supply device and the moving body device, thereby effectively resolving a problem that a distance by which the moving body device can move is limited by an intrinsic length of a power line. The power rail is designed and laid along a working track of the moving body device, so that the moving body device can perform reciprocating motion in a plurality of places that needs to be worked in, thereby resolving a problem that places to which the moving body device can move are undiversified due to the intrinsic power line length, and also avoiding a problem such as possible winding and wearing or molting caused by friction when the moving body device performs the reciprocating motion. In addition, that there is no physical contact between the transmission line and the moving body device may further effectively prevent a problem such as spark generation or wearing between the non-contact power-supply device and the moving body device due to contact between the non-contact power-supply device and the moving body device, and therefore can further prevent the environmental problem such as fine particles and dust. Therefore, supplying power by using the non-contact power-supply device enables the moving body device to work in a place that requires a dust-free condition, and a service life of the moving body device is relatively long and the costs are relatively low.

The foregoing descriptions are merely specific embodiments of this application, but are not intended to limit the protection scope of this application. Any modification or replacement readily figured out by persons skilled in the art within the technical scope disclosed in this application shall fall within the protection scope of this application. Therefore, the protection scope of this application shall be subject to the appended claims.

What is claimed is:

1. An automation system, comprising:
   a non-contact power-supply device, configured to supply power to a moving body device, and comprising a power rail, a power-obtaining circuit, and a power supply receiving circuit, wherein the power-obtaining circuit and the power supply receiving circuit are mounted on the moving body device, and are configured to: when the moving body device moves, obtain an inductive alternating current by using an electromagnetic induction effect between the power-obtaining circuit and the power rail, and an input end of the power supply receiving circuit is electrically connected to the power-obtaining circuit, and is configured to convert the inductive alternating current obtained by the power-obtaining circuit into a stably-output direct current; and
   the moving body device, comprising a body, an inverter circuit, and a motor-control circuit, wherein the inverter circuit and the motor-control circuit are disposed on the body, an input end of the inverter circuit is electrically connected to an output end of the power supply receiving circuit, and an output end of the inverter circuit is electrically connected to an input end of the motor-control circuit, and the inverter circuit is configured to invert the direct current stably output by the non-contact power-supply device into an alternating current required by the moving body device, to supply power to the motor-control circuit for driving the moving body device to move, wherein a bottom of the body is provided with a base, and the power-obtaining circuit and the power supply receiving circuit are mounted on a lower or side end face of the base, wherein the inverter circuit and the motor-control circuit are mounted on an upper end face of the base.

2. The automation system according to claim 1, wherein the automation system comprises: a plurality of moving body devices, a plurality of power-obtaining circuits and a plurality of power supply receiving circuits that are provided corresponding to the plurality of moving body devices, and the plurality of moving body devices are all powered by the non-contact power-supply device.

3. The automation system according to claim 1, wherein a high-frequency current of the non-contact power-supply device is provided by a high-frequency power supply box.

4. The automation system according to claim 3, wherein the power rail comprises: a first guide rail, a second guide rail disposed opposite to the first guide rail, and a primary induction coil that is laid along inner sides of the first guide rail and the second guide rail and forms a complete loop, the primary induction coil generates an electromagnetic induction force after being conducted, the power-obtaining circuit comprises a coil-winding portion, and the coil-winding portion is configured to wind around a secondary induction coil, and when the moving body device moves, the secondary induction coil obtains an inductive alternating current by using an electromagnetic induction effect between the secondary induction coil and the primary induction coil.

5. The automation system according to claim 4, wherein the high-frequency power supply box comprises a non-induction line configured to connect the high-frequency power supply box and the primary induction coil.

6. The automation system according to claim 5, wherein the non-induction line is a single line, and power provided by the high-frequency power supply box comprises single-wire 20 kW and single-wire 30 kW.

7. The automation system according to claim 5, wherein the non-induction line is a double line, and power provided by the high-frequency power supply box comprises double-wire 7 kW and double-wire 40 kW.

8. The automation system according to claim 4, wherein the power rail is further provided with a thermal wire, the thermal wire is laid along a track of the primary induction coil, and the thermal wire is configured to automatically stop operation of the non-contact power-supply device and stop supplying power to the moving body device after detecting a high temperature.

9. The automation system according to claim 4, wherein the power-obtaining circuit is an E-shaped magnetic core, two parallel magnetic core parts at two ends of the E-shaped magnetic core form a first magnetic pole portion and a second magnetic pole portion, and a magnetic core part on a middle position and parallel to the first magnetic pole portion and the second magnetic pole portion forms the coil-winding portion.

10. The automation system according to claim 9, wherein the E-shaped magnetic core is located above the power rail, and an opening of the E-shaped magnetic core faces toward the power rail, so that the first magnetic pole portion and the second magnetic pole portion are respectively located on external sides of the first guide rail and the second guide rail, and the coil-winding portion is located on the inner sides of the first guide rail and the second guide rail.

11. The automation system according to claim 1, wherein the power-obtaining circuit is a single-wire circuit, and a rated power of the power-obtaining circuit is 0.6 kW.

12. The automation system according to claim 1, wherein the power-obtaining circuit is a single-wire circuit, and a rated power of the power-obtaining circuit is 1.5 kW.

13. The automation system according to claim 1, wherein the power-obtaining circuit is a single-wire circuit, and a rated power of the power-obtaining circuit is single-wire 2.5 kW.

14. The automation system according to claim 1, wherein the power-obtaining circuit is a single-wire circuit, and a rated power of the power-obtaining circuit is double-wire 5 kW.

15. The automation system according to claim 1, wherein the power supply receiving circuit is of a constant voltage output type DC 320 V.

16. The automation system according to claim 15, wherein output power of the power supply receiving circuit comprises any one of 1.2 kW, 1.5 kW, single-wire 2.5 kW, and double-wire 5 kW.

17. The automation system according to claim 1, wherein the power-obtaining circuit and the power supply receiving circuit are mounted on a lower end face of the base.

18. The automation system according to claim 17, wherein the lower end face of the base is provided with a mounting position, configured to fixedly mount the power-obtaining circuit and the power supply receiving circuit.

19. The automation system according to claim 1, wherein the power-obtaining circuit and the power supply receiving circuit are mounted on a left end face of the base.

20. The automation system according to claim 1, wherein a bottom of the body is provided with a base, and the power-obtaining circuit and the power supply receiving circuit are mounted on a right end face of the base.

* * * * *